United States Patent
Kim et al.

(10) Patent No.: US 9,891,453 B2
(45) Date of Patent: Feb. 13, 2018

(54) INTEGRATABLE PLANAR WAVEGUIDE TYPE NON-RECIPROCAL POLARIZATION ROTATOR

(71) Applicant: INHA-INDUSTRY PARTNERSHIP INSTITUTE, Incheon (KR)

(72) Inventors: Kyong Hon Kim, Incheon (KR); YuDeuk Kim, Incehon (KR); Dong Wook Kim, Seoul (KR); Moon Hyeok Lee, Incheon (KR)

(73) Assignee: INHA-INDUSTRY PARTNERSHIP INSTITUTE, Incheon (KR)

( * ) Notice: Subject to any disclaimer, the term of this patent is extended or adjusted under 35 U.S.C. 154(b) by 122 days.

(21) Appl. No.: 15/133,323

(22) Filed: Apr. 20, 2016

(65) Prior Publication Data

US 2017/0102565 A1  Apr. 13, 2017

(30) Foreign Application Priority Data

Apr. 21, 2015 (KR) .................. 10-2015-0055914

(51) Int. Cl.
| | |
|---|---|
| *G02B 6/00* | (2006.01) |
| *G02F 1/095* | (2006.01) |
| *G02B 6/27* | (2006.01) |
| *G02B 6/126* | (2006.01) |
| *G02F 1/01* | (2006.01) |

(52) U.S. Cl.
CPC .......... *G02F 1/0955* (2013.01); *G02B 6/126* (2013.01); *G02B 6/2766* (2013.01); *G02F 1/0136* (2013.01)

(58) Field of Classification Search
CPC ....................................................... G02F 1/093
See application file for complete search history.

(56) References Cited

U.S. PATENT DOCUMENTS

| | | | | |
|---|---|---|---|---|
| 6,049,427 A | * | 4/2000 | Bettman ............... | G02B 6/2746 359/484.05 |
| 2003/0021003 A1 | * | 1/2003 | Ono ......................... | G02F 1/09 359/280 |
| 2004/0001255 A1 | * | 1/2004 | Fratello ................ | G02B 5/3025 359/484.03 |

(Continued)

OTHER PUBLICATIONS

Amemiya et al, "Nonreciprocal Polarization Conversion in Asymmetric Magnetooptic Waveguide", (Nov. 2010), IEEE Journal of Quantum Electronics, vol. 46, No. 11, pp. 1662-1669, Brigham Young University, U.S.A.

(Continued)

*Primary Examiner* — Chris Chu
(74) *Attorney, Agent, or Firm* — Typha IP LLC (57) ABSTRACT

The present invention describes a planar waveguide-type integrated non-reciprocal polarization rotator. According to an embodiment of the present invention, the planar waveguide-type non-reciprocal 90° polarization rotator includes optical waveguide-type input and output ports, a reciprocal 45° polarization rotator based on an asymmetric optical waveguide structure, a non-reciprocal 45° polarization rotator based on an optical waveguide with a clad layer of magneto-optic material, and a phase compensator placed between the above reciprocal 45° polarization rotator and non-reciprocal 45° polarization rotator compensating the phase difference between two polarization modes.

7 Claims, 7 Drawing Sheets

(56) References Cited

U.S. PATENT DOCUMENTS

2013/0142475 A1    6/2013  Dallesasse et al.

OTHER PUBLICATIONS

Sang-Hun Kim et al, "Single-trench waveguide TE-TM mode converter",(Jul. 2009) Optics Express vol. 17, No. 14, pp. 11267-11273, Optical Society of America, U.S.A.
Fei et al, "A novel polarization rotator based on an asymmetric slot waveguide", (2014), Optics Communications, 324, 22-24. Elsevier.
Wang et al. "Ultrasmall Si-nanowire-based polarization rotator" (May 2008) Journal of Optical Society of America B vol. 25, No. 5, pp. 747-753, Optical Society of America, U.S.A.

* cited by examiner

INTEGRATABLE PLANAR WAVEGUIDE TYPE NON-RECIPROCAL POLARIZATION ROTATOR

CROSS-REFERENCE TO RELATED APPLICATIONS

This application claims the benefit of Korean Patent Application No. 10-2015-0055914, filed with the Korean Intellectual Property Office on Apr. 21, 2015, the disclosure of which is incorporated herein by reference in its entirety.

BACKGROUND

1. Technical Field

The present invention describes an integratable planar waveguide-type non-reciprocal polarization rotator. As an embodiment of the present invention, the planar waveguide-type non-reciprocal 90-degree polarization rotator includes optical waveguide-type input and output ports; a reciprocal 45-degree polarization rotator of an asymmetric optical waveguide structure; an optical waveguide-type non-reciprocal 45-degree polarization rotator with cladding layer of magneto-optic material; and a phase compensator which compensates the phase difference between polarizations by having positioned between the above reciprocal 45-degree polarization rotator and non-reciprocal 45-degree polarization rotator.

2. Description of the Related Art

On-chip-type non-reciprocal polarization rotators are important optical devices for future applications to integrated optical isolators and circulators and to various polarization sensors.

The non-reciprocal polarization rotator is an optical device rotating the polarization of an optical beam traveling in one direction by 90 degrees, but passing another optical beam traveling in the opposition direction without changing its polarization. The non-reciprocal polarization rotator can be used for applications to optical isolators and optical circulators by having polarization filters or polarization beam splitters combined at its input and output ports.

The optical isolators based on the non-reciprocal polarization rotator utilizing Faraday rotation function of the magneto-optic effect in bulk-optics have been used popularly. However, various approaches for integrated planar waveguide-type non-reciprocal polarization rotators, which can be integrated with other photonic devices, are still under development and not ready for a practical optical isolator of integration-type.

The conventional art of US 2013/0142475 describes an integrated non-reciprocal polarization rotator and an integrated optical isolator utilizing the integrated reciprocal and non-reciprocal polarization rotators, which have a block of magneto-optic material, such as bismuth europium holmium gallium iron garnet or bismuth yttrium iron garnet, located between two silicon waveguides, an index-matching layer formed between the silicon waveguide and magneto-optic material, and a magnetic field applied to the magneto-optic material by attaching a magnet. This prior art uses a scheme of 45° polarization rotation in the reciprocal polarization rotator section and additional 45° polarization rotation in the non-reciprocal polarization rotator section. However, this art requires a difficult fabrication process to form an index-matching layer between the silicon waveguide and magneto-optic material, and has a significant drawback of a high optical loss over the entire device.

Another prior art of the non-reciprocal polarization rotator has been demonstrated by using birefringence between two orthogonal polarization modes in an InGaAsP optical waveguide of asymmetric square shape with one side of inclined surface, which includes a hybrid integration of Ce:YIG crystal formed on the top of the waveguide and a magnetic field applied in an orthogonal direction to the light propagation direction [IEEE J. Quantum Electronics 46(11), 1662 (2010)]. In this art, the etching control is not easy to form the asymmetric InGaAsP optical waveguide and a uniform bonding process of the magneto-optic crystal is difficult. Thus, this art has a drawback of low efficiency of the Faraday polarization rotation.

A prior art of a reciprocal polarization rotator describes reciprocal polarization rotation in a GaInAsP or Si waveguide having a long asymmetric trench pattered inside the waveguide [Opt. Express 17(14), 11267 (2009) & Opt. Commun. 324, 22 (2014)]. In this art, a long asymmetric trench is formed in the semiconductor waveguide, and the waveguide rotates the TE polarization mode into TM polarization mode for an optical beam travelling in either direction. However, this art cannot provide the function of non-reciprocal polarization rotation.

Another prior art of the reciprocal polarization rotator is proposed by numerical simulation on reciprocal 90° polarization rotation in a silicon nanowire waveguide with a partially etched section [J. Opt. Soc. Am. B 25(5), 747 (2008)]. This prior art describes only a scheme of reciprocal polarization rotation for optical beams in both directions, but cannot provide the function of non-reciprocal polarization rotation.

SUMMARY OF THE INVENTION

The present invention provides a planar waveguide-type non-reciprocal polarization rotator which has a low insertion loss and an excellent integration property with laser diode and with other optical signal processing devices into a single integrated device. The present invention of the planar waveguide-type non-reciprocal polarization rotator consists of a reciprocal polarization rotator which rotates the polarization of an incoming beam by 45° reciprocally with a birefringence induced by an asymmetric structure of semiconductor optical waveguide and a non-reciprocal polarization rotator which rotates the polarization by 45° non-reciprocally with a symmetric optical waveguide having an upper clad of magneto-optic (MO) material and a magnetic field applied from top. This invented device provides a non-reciprocal function by rotating the polarization of the optical beam traveling in one direction to 90°, but by transmitting the optical beam traveling in the opposite direction without rotating its polarization. This invention allows a silicon-on-oxide (SOI) wafer based planar waveguide-type non-reciprocal polarization rotator with an easy integration, low insertion loss, large polarization extinction ratio (PER), and wide operation bandwidth.

According to an embodiment of the present invention, a planar waveguide-type non-reciprocal 90° polarization rotator is provided. The non-reciprocal polarization rotator includes optical waveguide-type input and output ports, a reciprocal 45° polarization rotator based on an asymmetric optical waveguide structure, a non-reciprocal 45° polarization rotator based on an optical waveguide with a clad layer of magneto-optic material, and a phase compensator placed between the above reciprocal 45° polarization rotator and non-reciprocal 45° polarization rotator compensating the phase difference between two polarization modes.

The clad layer of magneto-optic material in the above planar waveguide-type non-reciprocal 90° polarization rotator can comprise a magneto-optic polymer.

The clad layer of the non-reciprocal 45° polarization rotator in the above planar waveguide-type non-reciprocal 90° polarization rotator can be covered with a layer of magnetic material.

The reciprocal 45° polarization rotator in the above planar waveguide-type non-reciprocal 90° polarization rotator can consist of an optical waveguide with a partially etched section and tapered end structures patterned after an etching process.

The phase compensator in the above planar waveguide-type non-reciprocal 90° polarization rotator can be formed with an optical waveguide of different width (W4) and height (H4) to control the phases of polarization components based on the refractive index difference between two orthogonal polarization modes, and with two ends of tapered structures when the optical waveguide width of the phase compensator is different from those connected at its both ends.

The above planar waveguide-type non-reciprocal 90° polarization rotator can act as an optical isolator by attaching a pair of polarization beam splitter and combiner to the input and output ports.

According to another embodiment of the planar waveguide-type non-reciprocal polarization rotator of the present invention, it includes optical waveguide-type input and output ports, a reciprocal 45° polarization rotator based on an asymmetric optical waveguide structure, a non-reciprocal 45° polarization rotator based on an optical waveguide with a clad layer of magneto-optic material, a phase compensator placed between the above reciprocal 45° polarization rotator and non-reciprocal 45° polarization rotator compensating the phase difference between two polarization modes, and a pair of polarization beam splitter and combiner attached to the input and output ports to act as an polarization-insensitive optical isolator.

DETAILED DESCRIPTION OF THE INVENTION

Hereinafter, the present invention will be described in more detail with reference to the accompanying drawings, in which exemplary embodiments of the invention are shown.

An embodiment of the present invention is related to a planar waveguide-type non-reciprocal polarization rotator which has a low insertion loss and an excellent integration property with laser diode and with other optical signal processing devices into a single integrated device, and which can also be used for application to optical isolator and circulator.

The present invention can be fabricated in a small integrated optic device of non-reciprocal polarization rotator of low insertion loss (IL) and high polarization extinction ratio (PER), especially, in a monolithic integrated form of a planar optical waveguide, contrary to the conventional monolithic reciprocal polarization rotator and to the conventional hybrid-integrated planar waveguide-type optical isolator, optical circulator and non-reciprocal rotator.

Figure 1:
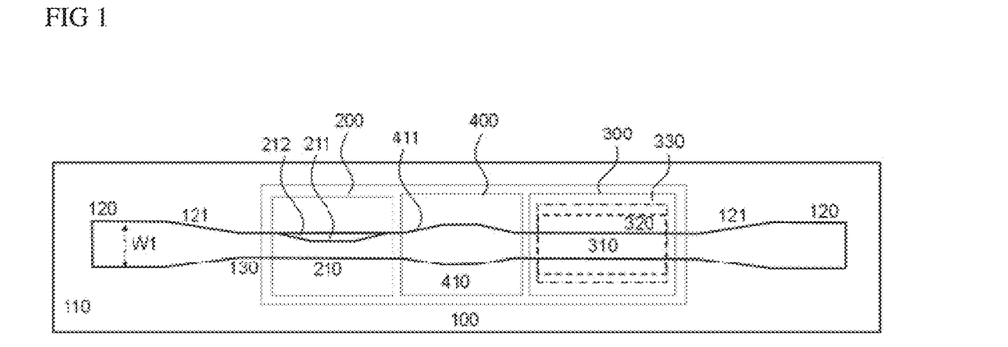
FIG. 1 is a plan view of a schematic diagram of a planar waveguide-type non-reciprocal 90° polarization rotator, according to an embodiment of the present invention.

FIG. 1 is a planar waveguide-type non-reciprocal 90° polarization rotator, according to an embodiment of the present invention.

In FIG. 1, the planar waveguide-type non-reciprocal 90° polarization rotator 100 formed on a semiconductor wafer 110 includes a reciprocal 45° polarization rotator 200 and a non-reciprocal 45° polarization rotator 300. For a complete polarization rotation, a phase compensator 400 can be added to compensate the phase difference between the polarization modes of the light beam passing the reciprocal 45° polarization rotator 200.

According to an embodiment of the present invention, the planar waveguide-type non-reciprocal 90° polarization rotator includes optical waveguide-type input and output ports, a reciprocal 45° polarization rotator based on an asymmetric optical waveguide structure, a non-reciprocal 45° polarization rotator based on an optical waveguide with a clad layer of magneto-optic material, and a phase compensator placed between the above reciprocal 45° polarization rotator and non-reciprocal 45° polarization rotator compensating the phase difference between two polarization modes.

The optical waveguide 120 in general optical waveguide circuits usually has a pattern of low height and relatively wide width (W1). When the optical waveguide 120 is connected to the optical waveguides 130 and 210 of a relatively narrow width used for the reciprocal 45° polarization rotator, a tapered optical waveguide 121 can be used to reduce the optical loss.

The reciprocal 45° polarization rotator which is used to form a planar waveguide-type non-reciprocal 90° polarization rotator is described in detail below.

Figure 2A:
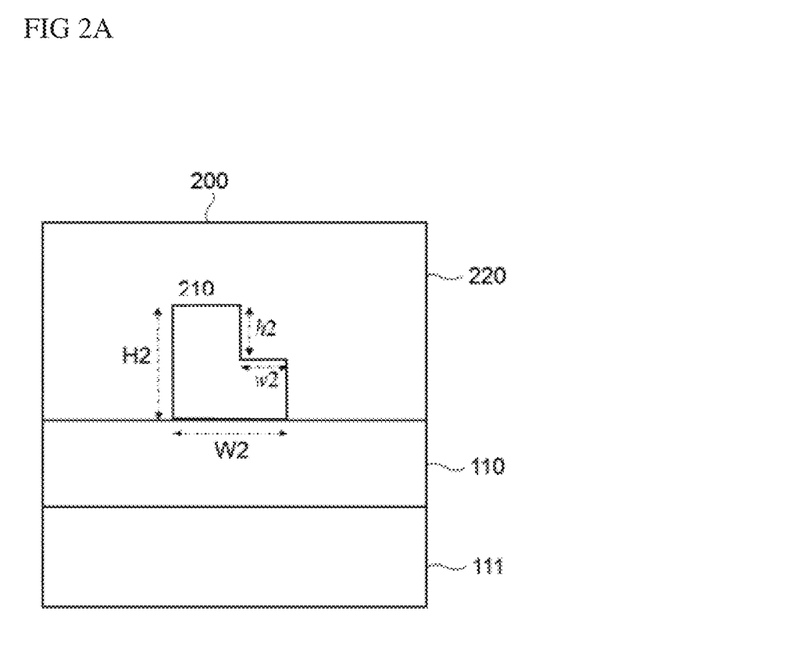
FIG. 2A is a cross-sectional view of a reciprocal 45° polarization rotator, according to an embodiment of the present invention.
Figure 2B:
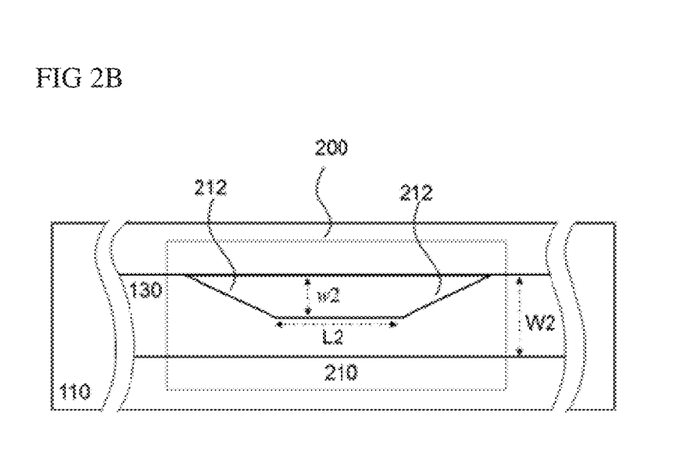
FIG. 2B is a plane view of a reciprocal 45° polarization rotator, according to an embodiment of the present invention.

FIG. 2A is a cross-sectional view of a reciprocal 45° polarization rotator, according to an embodiment of the present invention. FIG. 2B is a plane view of a reciprocal 45° polarization rotator, according to an embodiment of the present invention.

In FIG. 2A, the reciprocal 45° polarization rotator is composed of an optical waveguide 210 of height (H2) and width (W2) of a similar dimension. One side of the optical waveguide 210 can be formed into an optical waveguide 211 etched in a square shape of height (h2) and width (w2).

As illustrated in FIG. 2B, the etched waveguide 211 be connected to the optical waveguide 210 with optical waveguides 212 of a tapered shape to reduce optical losses at optical beam input and output sections. The planar waveguide devices are made of a core material of low optical loss and of high refractive index, and formed on a lower clad layer 110 of relatively low refractive index which is usually made from an oxidation layer forming process on a semiconductor wafer 111. Finally, an upper clad layer 220 of relatively low index material needs to be formed for maintaining uniform and reliable properties of the planar waveguide devices.

The length of the optical waveguides 212 of tapered etch shape needs to be optimized for a minimum optical loss, and the height (h2) and width (w2) of the optical waveguide 211 etched in a square shape also can be formed in optimum dimensions compared to the height (H2) and width (W2) of the original waveguide 210 for 45° polarization rotation.

The device operation is based on the principle of the polarization rotation of the traveling beam due to birefringence caused by the optical waveguides 210 with an etched side for the TE and TM polarization modes.

The non-reciprocal 45° polarization rotator which is used to form a planar waveguide-type non-reciprocal 90° polarization rotator is described in detail below.

Figure 3A:
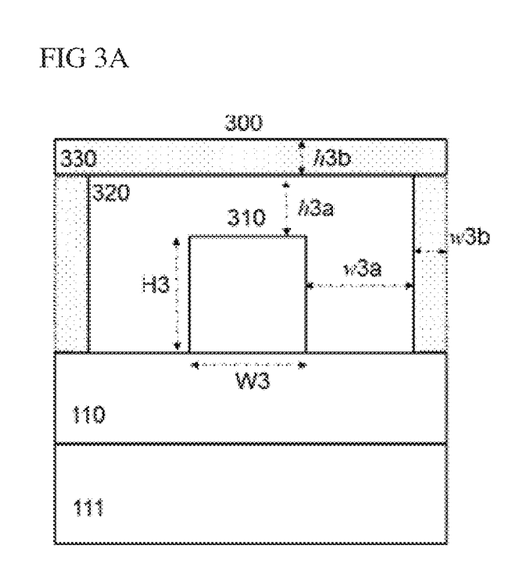
FIG. 3A is a cross-sectional view of a non-reciprocal 45° polarization rotator, according to an embodiment of the present invention.
Figure 3B:
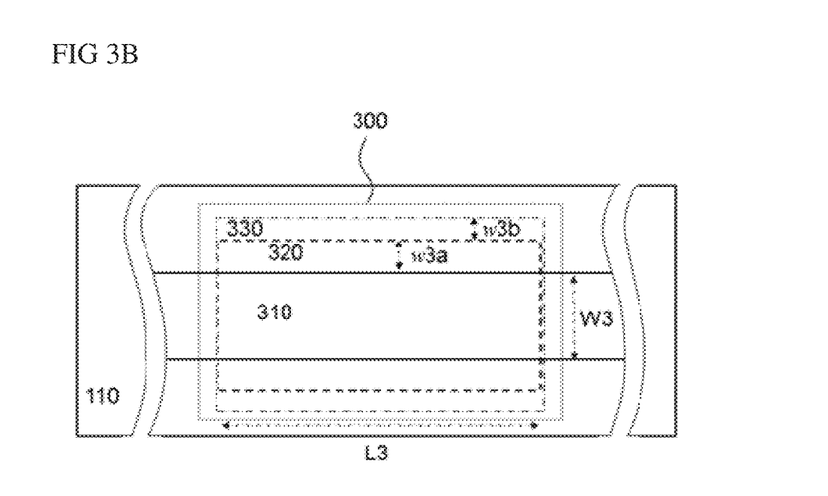
FIG. 3B is a plane view of a non-reciprocal 45° polarization rotator, according to an embodiment of the present invention.

FIG. 3A is a cross-sectional view of a non-reciprocal 45° polarization rotator, according to an embodiment of the present invention. FIG. 3B is a plane view of a non-reciprocal 45° polarization rotator, according to an embodiment of the present invention.

In FIG. 3A, the non-reciprocal 45° polarization rotator 300 is composed of an optical waveguide 310 of height (H3) and width (W3) of a similar dimension. An upper clad layer 320 of a magneto-optic material is formed on the core optical waveguide 310, and a magnetic field is applied by covering a magnetic material layer 330. The width W3 and height H3 of the core optical waveguide 310 can be set to the same as the width W2 and height H2 of the optical waveguide in the previous reciprocal 45° polarization rotator.

The upper clad layer 320 of magneto-optic material can be made of magneto-optic polymer. For examples, the clad layer 320 can be spin-coated with a polymer material of $Fe_3O_4$ core-polymer shell nanoparticle/PMMA matrix composites [Appl. Phys. Lett. 95, 143302 (2009)] or of Regioregular poly(3 hexyl thiophene) [Chem. Mater. 23, 516 (2011)], or formed with a layer of a magneto-optic crystal, such as cerium-doped yttrium iron garnet (Ce:YIG), bismuth europium holmium gallium iron garnet, or bismuth yttrium iron garnet.

The top height (h3a) and side width (w3a) of the clad layer 320 of magneto-optic material can be determined for optimum values by considering the magneto-optic coefficient of the MO material, the magnitude of the applied magnetic field, and the length L3.

A bulk-type permanent magnetic or a plastic magnet can be placed on the top of the upper clad layer 320 to apply a magnetic field and to induce the polarization rotation in the magneto-optic materials. Depending on the characteristics of the magnetic material, the thickness (w3b) of the side wall can be included, or only a top magnetic material layer 330 of a proper thickness (h3b) can be formed.

As illustrated in FIG. 3B, the length L3 of the optical waveguide covered with the magneto-optic material is determined to a length causing a non-reciprocal 45° polarization rotation to a traveling light beam.

Figure 4A:
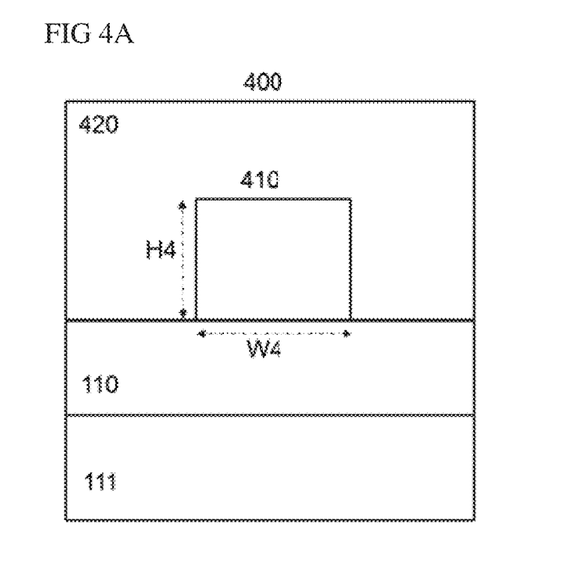
FIG. 4A is a cross-sectional view of a phase compensator, according to an embodiment of the present invention.
Figure 4B:
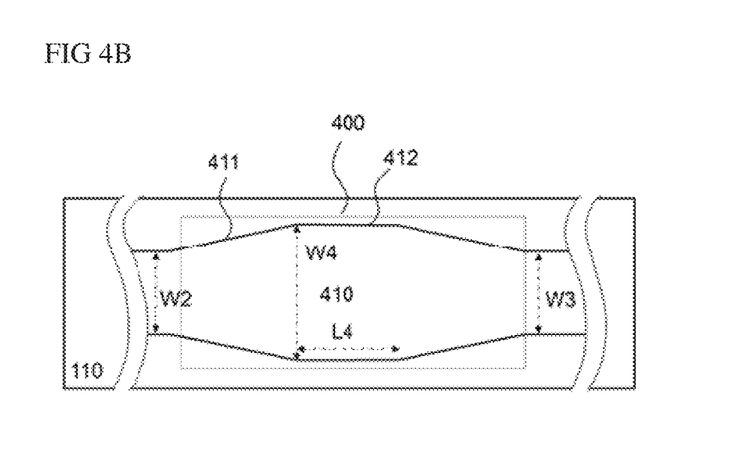
FIG. 4B is a plane view of a phase compensator, according to an embodiment of the present invention.

FIG. 4A is a cross-sectional view of a phase compensator, according to an embodiment of the present invention. FIG. 4B is a plane view of a phase compensator, according to an embodiment of the present invention.

In FIG. 4A, a phase compensator 400, which is used to form the planar waveguide-type non-reciprocal 90° polarization rotator, is placed between the above reciprocal 45° polarization rotator and non-reciprocal 45° polarization rotator to compensate the phase difference between two polarization modes.

The phase compensator 400 compensates the phase difference between TE and TM polarization modes, which results from the beam passage through each of the reciprocal 45° polarization rotator 200 and non-reciprocal 45° polarization rotator 300 in the non-reciprocal 90° polarization rotator 100.

By using the difference between the effective indices of two orthogonal polarizations with different width (W4) and height (H4) of the optical waveguide, the phase of each polarization mode can be controlled. This means that the overall polarization rotation property of the non-reciprocal 90° polarization rotator 100 can be optimized by controlling the length L4 of the phase compensator 400.

In a case that the width (W4) of the optical waveguide 412 in the phase compensator 400 is different from those of the optical waveguides connected at its both ends, tapered optical waveguides 411 are placed at both sides.

Figure 5:
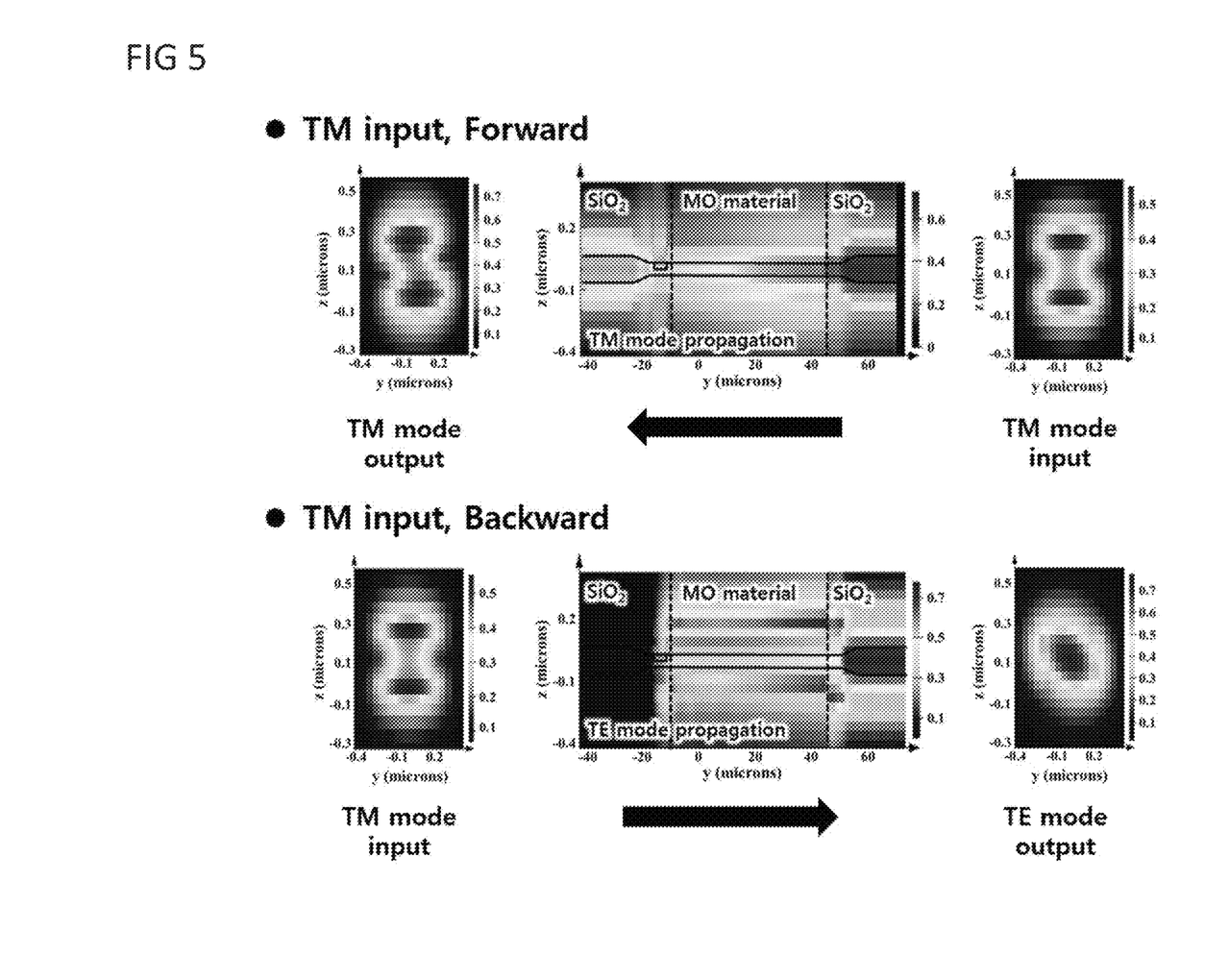
FIG. 5 is a contour map of the electric field profile of the propagating beam in a planar waveguide-type non-reciprocal 90° polarization rotator without a phase compensator, according to an embodiment of the present invention.

FIG. 5 is a contour map of the electric field profile of the propagating beam in a planar waveguide-type non-reciprocal 90° polarization rotator without a phase compensator, according to an embodiment of the present invention shown in FIG. 1.

In FIG. 5, the electric field profiles of the beams traveling to the opposite sides when incoming beams enter in the forward and backward directions into the planar waveguide-type non-reciprocal 90° polarization rotator without a phase compensator. The top figure of FIG. 5 shows the simulated result of the TM-mode output from the left-hand side for a TM-mode input on the right-hand side of the non-reciprocal 90° polarization rotator 100 without a phase compensator 400. The bottom figure of FIG. 5 shows the simulated result of the TE-mode output from the left-hand side after a 90° polarization rotation for a TM-mode input on the right-hand side.

Figure 6:
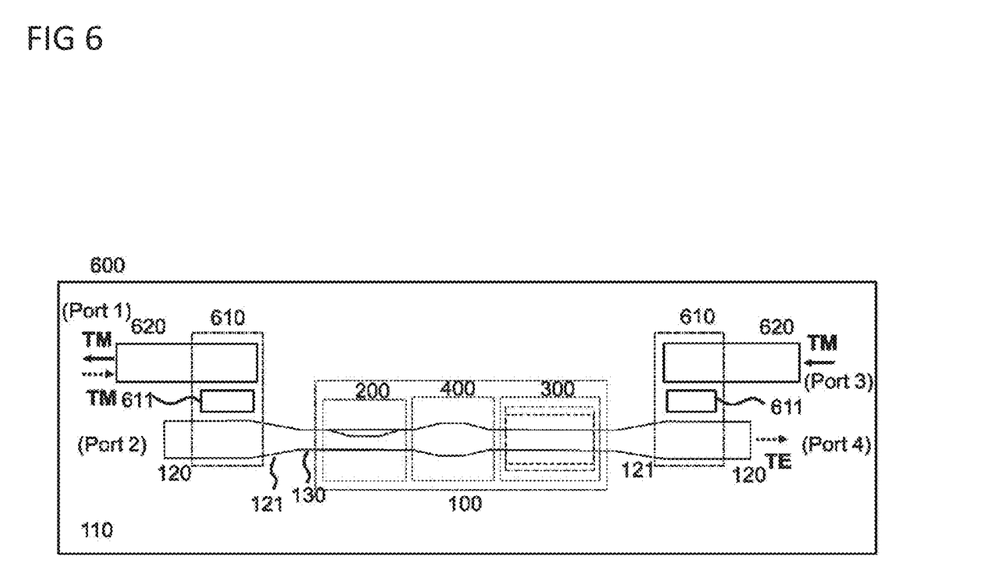
FIG. 6 is a plane view of an application scheme to an optical isolator, according to an embodiment of the present invention.

FIG. 6 is a plane view of an application scheme to an optical isolator, according to an embodiment of the present invention.

In FIG. 6, an optical isolator scheme is shown for a TM polarization mode by combining a pair of polarization beam splitter and combiner with the planar waveguide-type non-reciprocal 90° polarization rotator. Combination of the polarization beam splitter and combiner 610 with coupled optical waveguides 620 at the both ends of the non-reciprocal 90° polarization rotator 100 acts as an optical isolator 600 for an input TM-mode beam travelling from the right-hand side (Port 3) to the left-hand side (Port 1) and for a reflected beam to the input.

The polarization beam splitter and combiner 610 consist of polarization couplers using optical bridge waveguides 611. The TM-mode beam travelling from the left-hand side (Port 1) to the right-hand side passes the polarization beam splitter and combiner 610 and outputs through the right-hand side (Port 4) after conversion to the TE-mode during the propagation through the non-reciprocal 90° polarization rotator. Thus, this device acts as an optical isolator for a TM-mode input at the Port 3.

Figure 7:
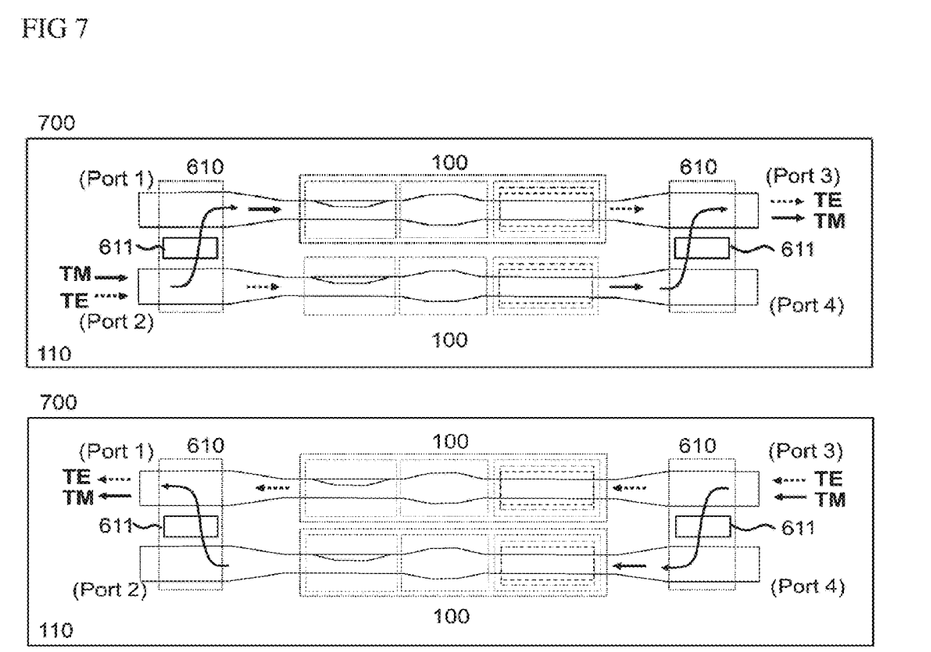
FIG. 7 is a plane view of another application scheme to an optical isolator and circulator, according to an embodiment of the present invention.

FIG. 7 is a plane view of another application scheme to an optical isolator and circulator, according to an embodiment of the present invention.

In FIG. 7, a polarization-independent optical isolator and circulator is demonstrated with combining a pair of planar waveguide-type non-reciprocal 90° polarization rotators and a pair of polarization beam splitter and combiner.

According to an embodiment of the present invention, the planar waveguide-type non-reciprocal polarization rotator can act as polarization-independent optical isolator by combining a pair of the planar waveguide-type non-reciprocal 90° polarization rotators, each of which includes optical waveguide-type input and output ports, a reciprocal 45° polarization rotator based on an asymmetric optical waveguide structure, a non-reciprocal 45° polarization rotator based on an optical waveguide with a clad layer of magneto-optic material, and a phase compensator placed between the above reciprocal 45° polarization rotator and non-reciprocal 45° polarization rotator compensating the phase difference between two polarization modes, with a pair of polarization beam splitter and combiner.

This scheme can be formed with a pair of the planar waveguide-type non-reciprocal 90° polarization rotators 100 and a pair of polarization beam splitter and combiner 610. In this scheme, each of TE and TM-mode beams entering into Port 2 can suffer a polarization rotation of 90° by the non-reciprocal 90° polarization rotators 100 and output through Port 3 on the opposite side. The reflected beam into Port 3 does not suffer any polarization rotation during passage through the non-reciprocal 90° polarization rotators 100 in opposite direction, and thus passes out through Port 1. Thus, this device can act as an optical isolator and circulator.

According to an embodiment of the present invention, the non-reciprocal 90° polarization rotator can be fabricated with a semiconductor device process, and formed with planar semiconductor waveguides of easy integration and with a clad of magneto-optic material to deliver a perfect polarization rotation property and a low insertion loss over a broad operating wavelength region.

According to another embodiment of the present invention, the planar waveguide-type non-reciprocal polarization rotator is a component of photonic integrated circuits, which can be easily integrated with optoelectronic devices of various functions with the conventional semiconductor process, and can be used in applications to optical isolators and optical circulators.

It is understood that the embodiments and drawings described herein are for illustrative purposes only and that various modifications or changes are possible to persons who have a common knowledge and skill in the art. For example, it will be evident that the explained techniques can be implemented in different orders according to the explained methods, and the explained system, scheme, equipment, and circuit are combined or gathered, or replaced with other components and equivalent items.

Thus, different demonstrations, embodiments and items equivalent to what are claimed are belong to the inventions claimed below:

What is claimed is:

1. An integrated planar waveguide-type non-reciprocal 90° polarization rotator comprising:
   optical waveguide-type input and output ports;
   a reciprocal 45° polarization rotator based on an asymmetric optical waveguide structure;
   a non-reciprocal 45° polarization rotator based on an optical waveguide with a clad layer of magneto-optic material; and
   a phase compensator placed between the above reciprocal 45° polarization rotator and non-reciprocal 45° polarization rotator compensating the phase difference between two polarization modes.

2. The integrated planar waveguide-type non-reciprocal 90° polarization rotator of claim 1 wherein the clad layer of magneto-optic material comprises a magneto-optic polymer.

3. The integrated planar waveguide-type non-reciprocal 90° polarization rotator of claim 1 further comprising a magnetic material layer formed on the top of the clad layer in the non-reciprocal 45° polarization rotator.

4. The integrated planar waveguide-type non-reciprocal 90° polarization rotator of claim 1 wherein the reciprocal 45° polarization rotator comprises an optical waveguide whose one side is etched and whose both ends are connected to tapered waveguides to reduce optical losses.

5. The integrated planar waveguide-type non-reciprocal 90° polarization rotator of claim 1 wherein the phase compensator controls the phase of each polarization mode by using the difference between the effective indices of two orthogonal polarizations with different width (W4) and height (H4) of the optical waveguide, and has tapered waveguide ends at both sides in a case that the width of the optical waveguide in the phase compensator is different from those of the optical waveguides connected at its both ends.

6. The integrated planar waveguide-type non-reciprocal 90° polarization rotator of claim 1 further comprising a pair of the polarization beam splitter and combiner attached at the both input and output ends of its optical waveguides so that the whole acts as an optical isolator.

7. The integrated planar waveguide-type non-reciprocal 90° polarization rotator of claim 1 further comprising:
   optical waveguide-type input and output ports;
   a reciprocal 45° polarization rotator based on an asymmetric optical waveguide structure;
   a non-reciprocal 45° polarization rotator based on an optical waveguide with a clad layer of magneto-optic material; and
   a phase compensator placed between the above reciprocal 45° polarization rotator and non-reciprocal 45° polarization rotator compensating the phase difference between two polarization modes;
   a pair of the polarization beam splitter and combiner attached to the planar waveguide-type non-reciprocal 90° polarization rotator so that the whole performs a function of a polarization-insensitive optical isolator.

* * * * *